United States Patent
Hashizume et al.

(10) Patent No.: US 8,106,920 B2
(45) Date of Patent: Jan. 31, 2012

(54) IMAGE DATA UPDATE APPARATUS

(75) Inventors: Masayuki Hashizume, Kariya (JP); Natsuko Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 484 days.

(21) Appl. No.: 12/318,482

(22) Filed: Dec. 30, 2008

(65) Prior Publication Data

US 2009/0179912 A1   Jul. 16, 2009

(30) Foreign Application Priority Data

Jan. 16, 2008 (JP) .................... 2008-6902

(51) Int. Cl.
- *G09G 5/00* (2006.01)
- *G08G 1/123* (2006.01)
- *G08G 1/00* (2006.01)

(52) U.S. Cl. ............. 345/611; 340/995.1; 701/117

(58) Field of Classification Search .......... 345/611; 340/426.19; 342/357.22; 701/19, 201–209
See application file for complete search history.

(56) References Cited

U.S. PATENT DOCUMENTS

| 5,159,436 A * | 10/1992 | Soneira .................. 348/181 |
| 6,922,629 B2 * | 7/2005 | Yoshikawa et al. ........ 701/117 |
| 2005/0052467 A1 | 3/2005 | Komuro |

FOREIGN PATENT DOCUMENTS

| JP | A-06-034382 | * 2/1994 |
| JP | A-09-304087 | 11/1997 |
| JP | A-2004-227338 | 8/2004 |

* cited by examiner

Primary Examiner — Kee M Tung
Assistant Examiner — Sing-Wai Wu
(74) Attorney, Agent, or Firm — Posz Law Group, PLC

(57) ABSTRACT

An image data update apparatus that can highlight a component with maintaining an appearance of an image to which anti-aliasing is applied and with suppressing increase in processing load is provided. When periodically changing a color arrangement of a traffic congestion line bordered using a color of black and displayed on a map image, only a central portion of the traffic congestion line is changed. Each time the color arrangement is changed, anti-aliasing is applied only to a boundary between the central portion and bordering portion but not to a boundary with a background map image.

11 Claims, 6 Drawing Sheets

IMAGE DATA UPDATE APPARATUS

CROSS REFERENCE TO RELATED APPLICATION

This application is based on and incorporates herein by reference Japanese Patent Application No. 2008-6902 filed on Jan. 16, 2008.

FIELD OF THE INVENTION

The present invention relates to an image data update apparatus that updates image data.

BACKGROUND OF THE INVENTION

Patent Document 1: JP-H6-34382 A
Patent Document 2: JP-H9-304087 A

Navigation apparatuses in the past generate images using 256 colors at the maximum. Navigation apparatuses in recent years generate images using 32,000 colors at the maximum. Anti-aliasing that smoothes change of color is applied to boundaries between components, such as a cursor showing a user's vehicle, various icons, traffic congestion lines on a map image displayed by the recent navigation apparatus, and their background image. Therefore, the recent navigation apparatuses can display more remarkably attractive images than those of the past navigation apparatuses.

Patent Document 1 discloses a navigation apparatus that can display visible images by anti-aliasing. Specifically, a navigation apparatus of Patent Document 1 calculates, when displaying a straight line, a ratio of an occupation by the straight line in one dot of an image, and sets colors of its peripheral dots in accordance with this ratio, displaying a visible image.

Processing load on a CPU increases when displaying an image to which anti-aliasing is applied. Accordingly, smooth screen scrolling is difficult. For addressing this disadvantage, a navigation apparatus of Patent Document 2 does not apply anti-aliasing to an image to be displayed when scrolling a screen fast.

Various components such as the above cursor, icons, and traffic congestion lines are displayed on a map image of a navigation apparatus. The navigation apparatus highlights these components, for example, by blinking the components and by periodically changing colors of the components.

Since the past navigation apparatuses display images using 256 colors at the maximum, the blinking and color changing of the above components such as the traffic congestion lines can be done without high processing load on CPUs. The recent navigation apparatuses display images using over 32,000 colors at the maximum, increasing sizes of image data largely. When blinking a component to which anti-aliasing is applied, anti-aliasing needs to be applied to the component and its background image composed of many colors each time the component enters an on state. Therefore, the processing load at the time of blinking components on an image and changing their colors increases largely in the recent navigation apparatuses in comparison with the past navigation apparatuses.

SUMMARY OF THE INVENTION

For addressing the above disadvantage, an object of the present invention is to provide an image data update apparatus capable of highlighting components while maintaining attractiveness of appearance of images to which anti-aliasing is applied and preventing increase of processing load.

As an example of the present invention, an image data update apparatus is provided as follows. The apparatus updates image data showing an image including two areas, anti-aliasing being applied to pixels around a boundary between the two areas, the anti-aliasing smoothing change of color on the boundary. The apparatus comprises an image data storage means and an image data update means. The image data storage means is configured for storing first image data showing a first image, part of which includes a first component, which has a first area with a predetermined color, the first area separating from each other the first component and a background area of the first component, wherein the anti-aliasing is applied to a pixel around a boundary between the first component and the first area and to a pixel around a boundary between the first area and the background area. The image data update means is configured for executing an image data update operation having a first step of generating second image data by changing part corresponding to an area including the first component and the first area in the first image among the first image data stored in the image data storage means while maintaining the anti-aliasing applied to the pixels around the boundary between the first area and the background area.

As another example of the present invention, a program storage medium is provided as follows. The medium contains instructions readable and executable by a computer. The instruction causes the computer to function as the means included in the above apparatus.

As yet another example of the present invention, a method is provided for generating a road map image using anti-aliasing to a pixel around a boundary between two areas in a road map for smoothing change of color on the boundary. The method comprises: arranging in an image (i) a background area, (ii) an indication area, and (iii) an edge area having a predetermined color, the edge area intervening between the background area and the indication area; applying anti-aliasing to pixels around, of the edge area, an outer boundary and an inner boundary to thereby complete generation of a first image, the outer boundary intervening between the background area and the edge area, the inner boundary intervening between the indication area and the edge area; and updating the first image by changing the indication area with the anti-aliasing having applied to the pixels around the outer boundary unchanged while applying anti-aliasing to pixels around an inner boundary of the edge area to thereby complete generation of a second image, the inner boundary intervening between the changed indication area and the edge area.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention are explained below using the drawings. It is to be understood that embodiments of the present invention is not intended to be limited to the following embodiments, and various changes may be made therein without departing from the spirit and scope of the present invention.

<Explanation of Structure>

Figure 1:
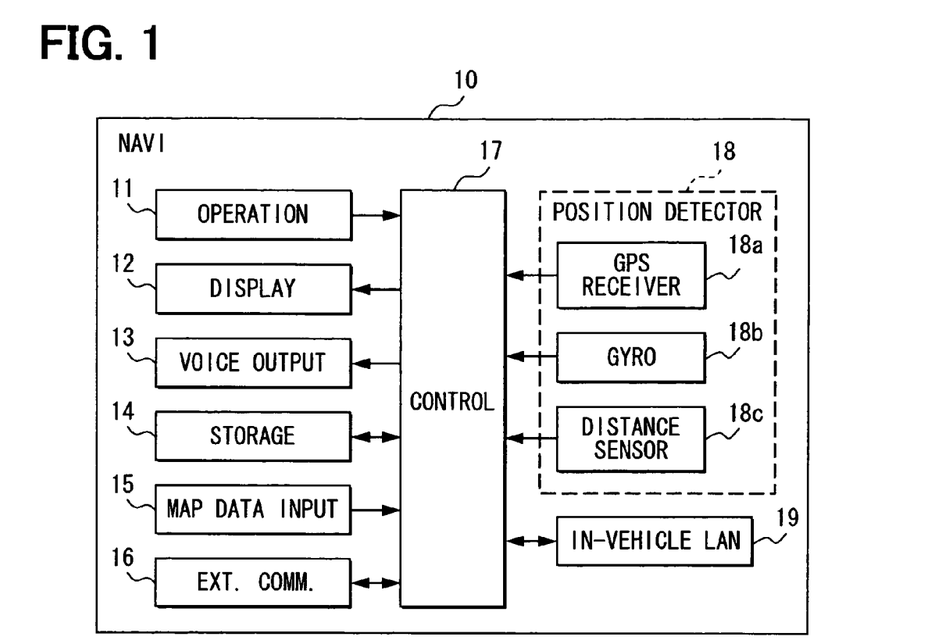
FIG. 1 is a block diagram showing a structure of a navigation apparatus.

FIG. 1 is a block diagram showing a structure of a navigation apparatus 10 explained in this embodiment. The navigation apparatus 10 includes an operation section 11, a display 12, a voice output section 13, a storage 14, a map data input section 15, an external communication section 16, a control section 17, a position detector 18, and an in-vehicle LAN communication section 19.

The operation section 11 receives various instructions from a user, and specifically includes a mechanical key switch and a touch switch.

The display 12 displays various indications, and specifically is composed of, for example, an LCD and an organic EL display. The display 12 displays images on an LCD, an organic EL display, etc. in accordance with image data generated by the control section 17.

The voice output section 13 outputs sounds in accordance with signals inputted from the control section 17.

The storage 14 includes a device not requiring data retention (for example, a HDD), and is capable of storing a variety of information.

The map data input section 15 inputs various data such as map data used for route guidance and facility retrieval information used for retrieving predetermined facilities. A storage medium for these data, which includes a large amount of data, generally uses a CD-ROM and a DVD-ROM.

The external communication section 16 acquires traffic information (accident information, congestion information, etc.) from a VICS center via an optical light beacon, a radio beacon, etc. installed at a roadside. Additionally, the external communication section 16 acquires traffic information transmitted by FM multiplex broadcasting.

The control section 17 is constructed around a microcomputer including a CPU, a ROM, a RAM, an I/O, and a bus line connecting these components. The control section 17 controls the sections of the navigation apparatus 10 in accordance with a program stored in the ROM. The control section 17 generates user's-vehicle periphery image data showing a map around a user's vehicle, a current position of the user's vehicle, congested roads, etc. in accordance with map data acquired via the map data input section 15, a current position of the user's vehicle detected by the position detector 18, and traffic information acquired by the external communication section 16. The control section 17 displays the user's-vehicle periphery image via the display 12 in accordance with this user's-vehicle periphery image data. The RAM of the control section 17 has an image data edit area to edit image data showing images displayed on the display 12. The control section 17 displays images on the display 12 in accordance with image data edited in this image data edit area. The control section 17 can apply anti-aliasing to a boundary between two images shown by image data stored in the image data edit area to smooth change of color around the boundary. Specifically, anti-aliasing is applied to pixels through which a boundary between two areas passes by setting a combined color of colors of the areas in accordance with a ratio between the areas in the pixels.

The position detector 18 includes a GPS (Global Positioning System) receiver 18*a* for detecting a position, direction, speed, etc. of a vehicle via a GPS antenna (not shown), a gyroscope 18*b* for detecting a magnitude of a rotational movement applied to a vehicle, and a distance sensor 18*c* for detecting a travel distance from, for example, an acceleration of a vehicle in a back-and-forth direction. These components have different characteristic errors, and thus supplement each other.

The in-vehicle LAN communication section 19 transmits and receives a variety of information via an in-vehicle LAN (not shown).

<Explanation of Image>

Figure 2:
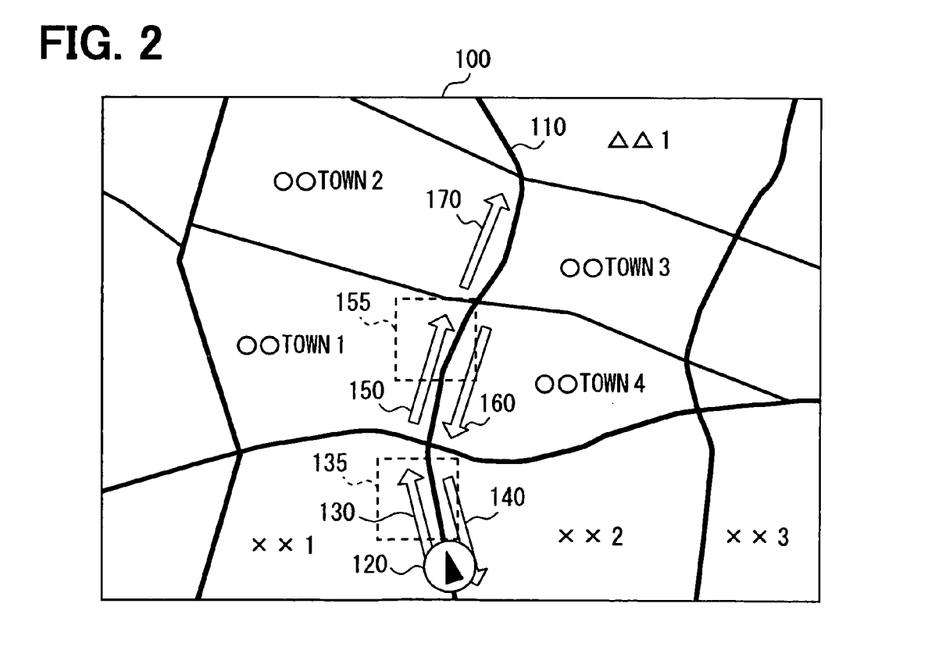
FIG. 2 is an example of a user's-vehicle periphery image.

Next, a user's-vehicle periphery image displayed by the navigation apparatus 10 is explained.

(1) User's-Vehicle Periphery Image

FIG. 2 shows an example of the user's-vehicle periphery image 100. The user's-vehicle periphery image 100 is constructed of, for example, map images including roads, geographic names, facilities, etc. around the user's vehicle (facilities etc. are not shown). Black lines drawn on the user's-vehicle periphery image 100 show roads.

A first road 110 passing through around the center of the user's-vehicle periphery image 100 vertically is a road on which the user's vehicle is traveling. A user's-vehicle icon 120 is drawn on a lower portion of the first road 110 and shows a current position of the user's vehicle.

An A traffic congestion line 130, a B traffic congestion line 140, a C traffic congestion line 150, a D traffic congestion line 160, and an E traffic congestion line 170 are drawn on the sides of the first road 110. Each of these traffic congestion lines corresponds to each road section between intersections of the first road 110 and to a travel direction of a vehicle in the road section. Each of these traffic congestion lines shows high traffic in the corresponding road section in the corresponding travel direction of the vehicle.

The A traffic congestion line 130 shows high traffic in a travel direction of the user's vehicle in a road section in which the user's vehicle is traveling. The A traffic congestion line 130 is highlighted to show the high traffic. This highlighting is mentioned later in detail.

In a road section and travel direction corresponding to the C traffic congestion line 150, traffic is higher and traffic congestion occurs in comparison with road sections and travel directions corresponding to the other traffic congestion lines. The C traffic congestion line 150 is highlighted differently from the A traffic congestion line 130 to show the high traffic. This highlighting is mentioned later in detail.

A map image etc. shown by the user's-vehicle periphery image 100 are scrolled in response to movement of the user's vehicle. At this time, the A traffic congestion line 130, the B traffic congestion line 140, the C traffic congestion line 150, the D traffic congestion line 160, and the E traffic congestion line 170 are scrolled together with the map image of their background. That is, positional relationship between these traffic congestion lines and components such as facilities (not shown) and roads forming a map image around the traffic congestion lines is fixed.

(2) Highlighting of a Traffic Congestion Line 130

Figure 3A:
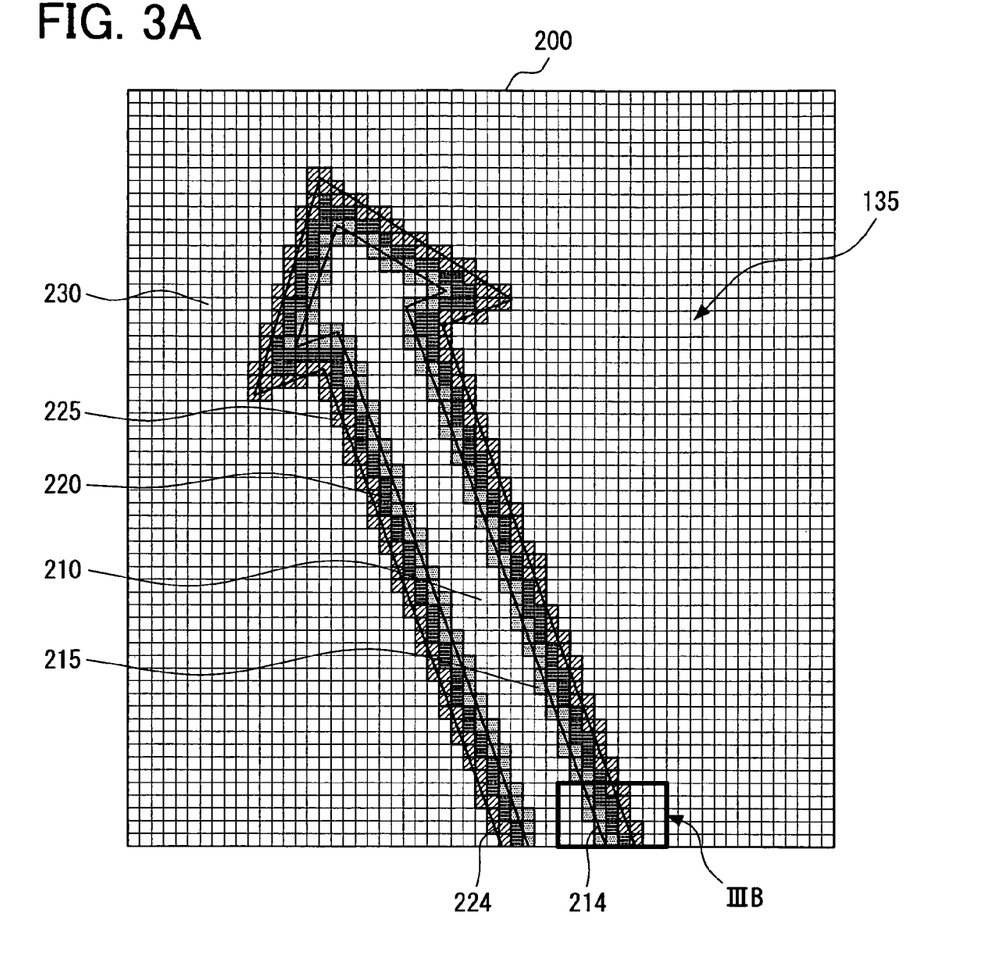
FIGS. 3A, 3B are an enlarged image of an A traffic congestion line periphery area.
Figure 3B:
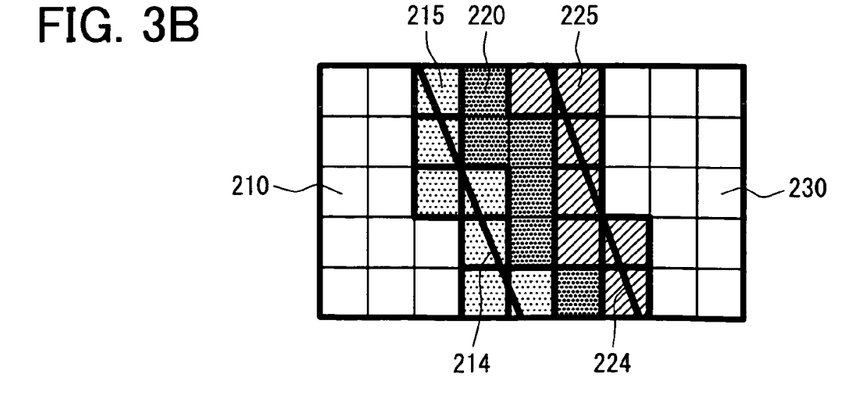

The highlighting of the A traffic congestion line 130 is explained below.

FIGS. 3A, 3B show an A traffic congestion line enlarged image 200, which is an enlarged image of an A traffic congestion line periphery area 135 including the A traffic congestion line 130. A grid described throughout the A traffic congestion line enlarged image 200 show pixels of the display 12 of the navigation apparatus 10.

First, areas forming the A traffic congestion line enlarged image 200 are explained. The A traffic congestion line enlarged image 200 is constructed of an A traffic congestion line central area 210 (also referred to as an indication area 210), an A congestion line edge area 220 (also referred to as a bordering area) separating from each other or bordering with each other the A traffic congestion line central area 210, and an A traffic congestion line background area 230 which is a background of the A traffic congestion line 130. The A traffic congestion line central area 210 and the A congestion line edge area 220 are divided by a first A boundary 214. The A congestion line edge area 220 and the A traffic congestion line background area 230 are divided by a second A boundary 224. Explanation is provided using the first A boundary 214 and the second A boundary 224 to facilitate the understanding, but these boundaries are not actually drawn on the user's-vehicle periphery image 100.

Next, color arrangements of the areas are explained. Two color arrangements, a first color arrangement and a second color arrangement, can be done to the A traffic congestion line 130. The A traffic congestion line 130 is highlighted by alternately switching the first color arrangement and the second color arrangement in a period of one second. The A traffic congestion line central area 210 is colored with light blue in the first color arrangement, and colored with orange in the second color arrangement. The A congestion line edge area 220 is colored with black in the first color arrangement and the second color arrangement. A map, roads, etc. around the user's-vehicle are drawn on the A traffic congestion line background area 230.

Anti-aliasing is applied to the pixels through which the first A boundary 214 between the A traffic congestion line central area 210 and the A congestion line edge area 220 and the second A boundary 224 between the A congestion line edge area 220 and the A traffic congestion line background area 230 pass. Specifically, anti-aliasing is applied by setting, in each pixel, a combined color of colors of areas in each pixel through which these boundaries pass in accordance with a ratio between the areas in each pixel. A first anti-aliasing area 215 (also referred to as an inner boundary of the edge area 220) is constructed of the pixels through which the first A boundary 214 passes, and anti-aliasing is applied to these pixels. A second anti-aliasing area 225 (also referred to as an outer boundary of the edge area 220) is constructed of the pixels through which the second A boundary 224 passes, and anti-aliasing is applied to these pixels.

Since the A congestion line edge area 220 has a width of over two pixels, one pixel is not influenced by colors of both the A traffic congestion line central area 210 and the A traffic congestion line background area 230 at the same time.

(3) Highlighting of C Traffic Congestion Line 150

Figure 4A:
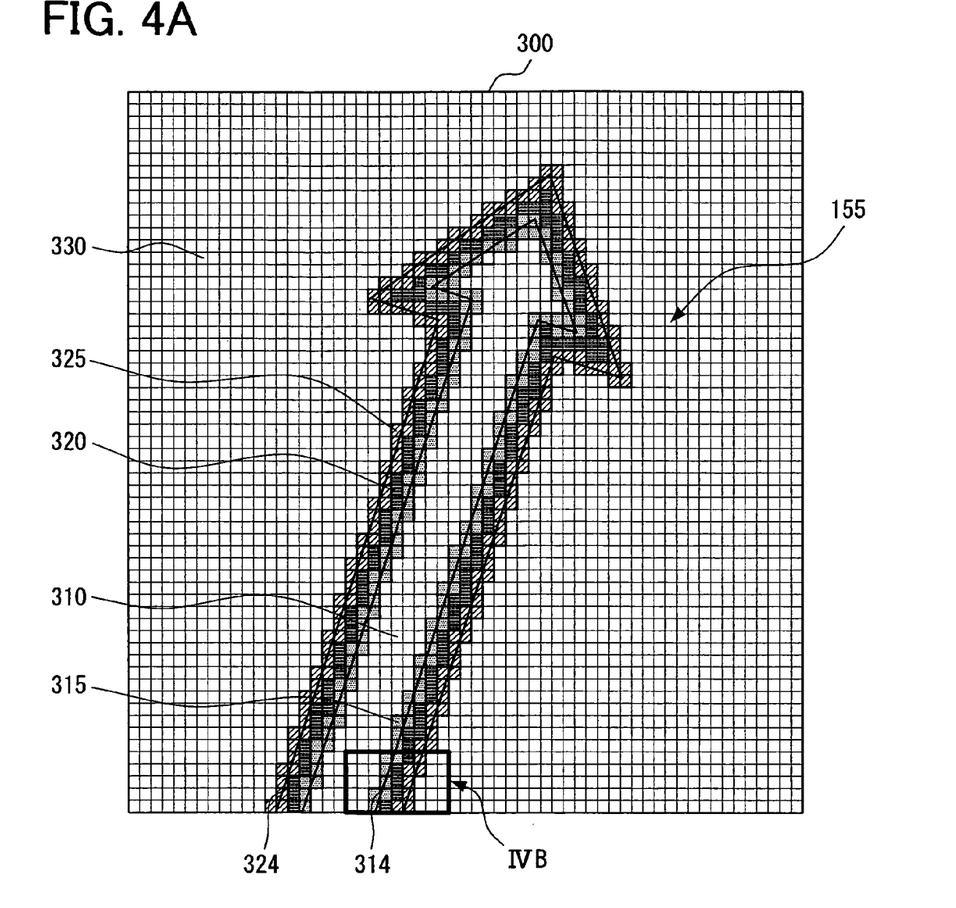
FIGS. 4A, 4B are an enlarged image of a C traffic congestion line periphery area when a C traffic congestion line is in an on state.
Figure 4B:
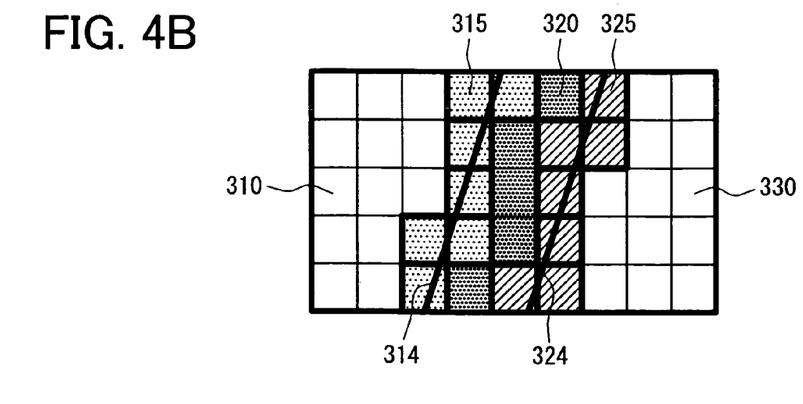
Figure 5A:
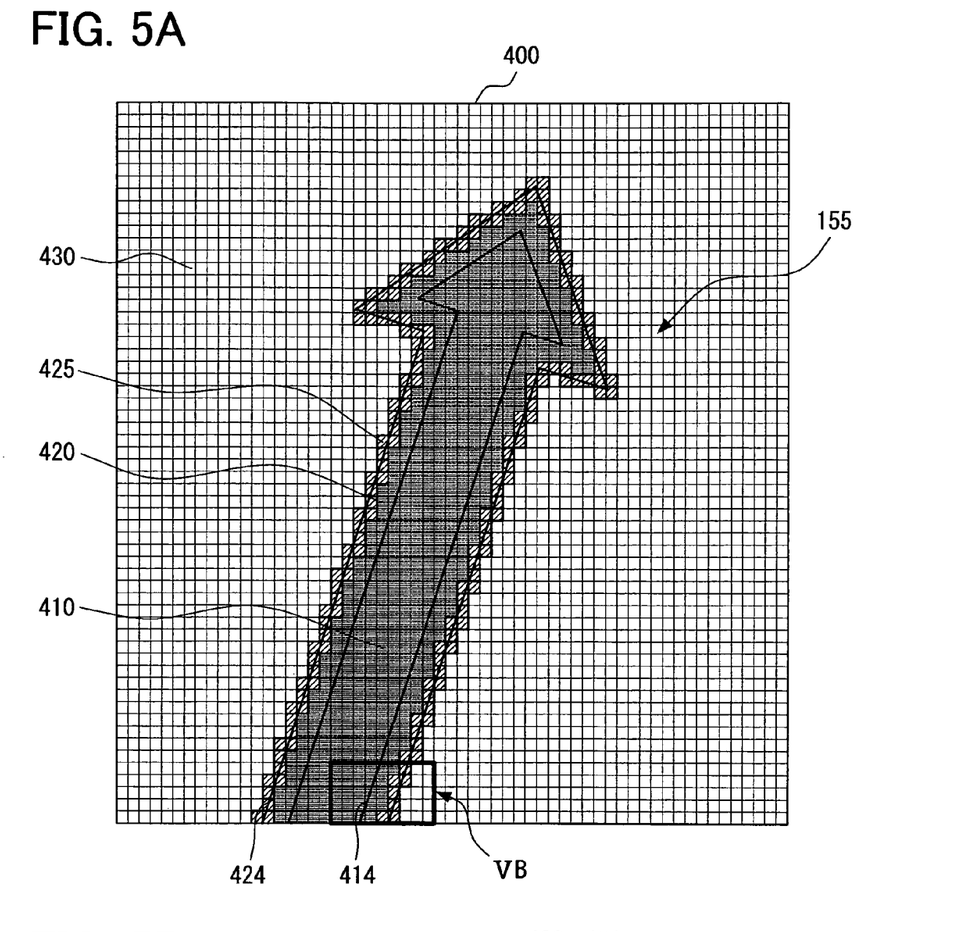
FIGS. 5A, 5B are an enlarged images of a C traffic congestion line periphery area when the C traffic congestion line is in an off state.
Figure 5B:
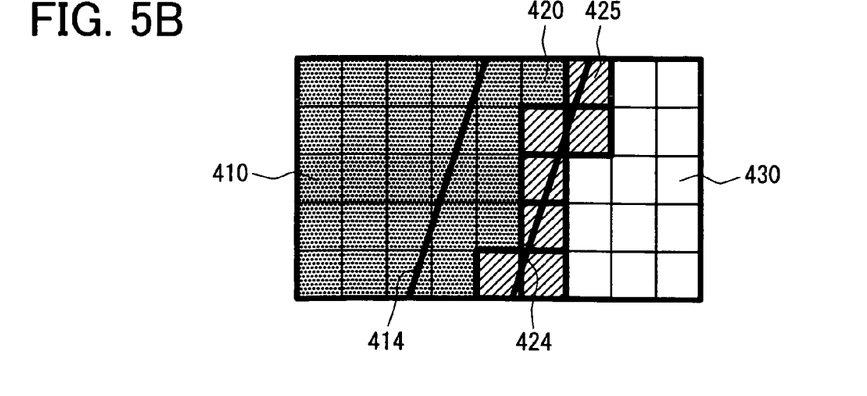

Highlighting of the C traffic congestion line 150 is explained below. FIGS. 4A, 4B show a first C traffic congestion line enlarged image 300, which is an enlarged image of a C traffic congestion line periphery area 155 including part of the C traffic congestion line 150, and FIGS. 5A, 5B show a second C traffic congestion line enlarged image 400. A grid drawn throughout the first C traffic congestion line enlarged image 300 and the second C traffic congestion line enlarged image 400 show pixels of the display 12 of the navigation apparatus 10.

The navigation apparatus 10 highlights the C traffic congestion line 150 by alternately displaying a traffic congestion line shown by the first C traffic congestion line enlarged image 300 and a traffic congestion line shown by the second C traffic congestion line enlarged image 400 in a period of one second as the C traffic congestion line 150. Areas forming the first C traffic congestion line enlarged image 300 or the second C traffic congestion line enlarged image 400 and color arrangements of the areas are explained.

The first C traffic congestion line enlarged image 300 is constructed of a first C traffic congestion line central area 310 (also referred to as an indication area 310), a first C traffic congestion line edge area 320 (also referred to as a bordering area 320) separating from each other or bordering with each other the first C traffic congestion line central area 310, and a first C traffic congestion line background area 330 which is a background of the C traffic congestion line 150. The first C traffic congestion line central area 310 is colored with red, and the first C traffic congestion line edge area 320 is colored with black. A map, roads, etc. around the user's-vehicle are drawn on the first C traffic congestion line background area 330. The first C traffic congestion line central area 310 and the first C traffic congestion line edge area 320 are divided by a third C boundary 314. The first C traffic congestion line edge area 320 and the first C traffic congestion line background area 330 are divided by a fourth C boundary 324. Explanation is provided using the third C boundary 314 and the fourth C boundary 324 to facilitate the understanding, but these boundaries are not actually drawn on the user's-vehicle periphery image 100.

Anti-aliasing is applied to pixels through which the third C boundary 314, which is a boundary between the first C traffic congestion line central area 310 and the first C traffic congestion line edge area 320, and the fourth C boundary 324, which is a boundary between the first C traffic congestion line edge area 320 and the first C traffic congestion line background area 330, pass. Specifically, anti-aliasing is applied by setting, in each of the pixels through which these boundaries pass, a combined color of colors of the areas in each of the pixels in accordance with a ratio between the areas in each of the pixels. A third anti-aliasing area 315 (also referred to as an inner boundary of the edge area 320) is constructed of pixels through which the third C boundary 314 passes, and anti-aliasing is applied to these pixels. A forth anti-aliasing area 325 (also referred to as an outer boundary of the edge area 320) is constructed of pixels through which the forth C boundary 324 passes, and anti-aliasing is applied to these pixels.

Since the first C traffic congestion line edge area 320 has a width of over two pixels, one pixel is not simultaneously influenced by both the color of the first C traffic congestion line central area 310 and the color of the first C traffic congestion line background area 330.

On the other hand, the second C traffic congestion line enlarged image 400 is constructed of a second C traffic congestion line central area 410 (also referred to as an indication area), a second C traffic congestion line edge area 420 (also referred to as a bordering area), a second C traffic congestion line background area 430, which is a background of the C traffic congestion line 150. The second C traffic congestion line central area 410 and the second C traffic congestion line edge area 420 are colored with Black. A map, roads, etc. around the user's-vehicle are drawn on the second C traffic congestion line background area 430. The second C traffic congestion line central area 410 and the second C traffic congestion line edge area 420 are divided by a fifth C boundary 414. The second C traffic congestion line edge area 420 and the second C traffic congestion line background area 430 are divided by a sixth C boundary 424. Explanation is provided using the fifth C boundary 414 and the sixth C boundary 424 to facilitate the understanding, but these boundaries are not actually drawn on the user's-vehicle periphery image 100.

Since the second C traffic congestion line central area 410 and the second C traffic congestion line edge area 420 are colored with black, anti-aliasing is not applied to pixels (of an inner boundary of the edge area 420) through which the fifth C boundary 414, which is a boundary between the second C traffic congestion line central area 410 and the second C traffic congestion line edge area 420, passes. On the other hand, anti-aliasing is applied to pixels through which the sixth C boundary 424, which is a boundary between the second C traffic congestion line edge area 420 and the second C traffic congestion line background area 430, passes. Specifically, anti-aliasing is applied by setting, in each of the pixels through which this boundary passes, a combined color of colors of areas in each of the pixels in accordance with a ratio between the areas. A fifth anti-aliasing area 425 (also referred to as an outer boundary of the edge area 420) is constructed of pixels through which a sixth C boundary 424 passes, and anti-aliasing is applied to these pixels.

The first C traffic congestion line background area 330 in the first C traffic congestion line enlarged image 300 and the second C traffic congestion line background area 430 in the second C traffic congestion line enlarged image 400 are the same. The first C traffic congestion line edge area 320 and the second C traffic congestion line edge area 420 have the same color. Therefore, the fourth anti-aliasing area 325 and the fifth anti-aliasing area 425 have the same shape and color.

<Explanation of Operation>

Next, highlighting of the A traffic congestion line 130 and C traffic congestion line 150 forming the user's-vehicle periphery image 100 by the navigation apparatus 10 is explained.

(1) Process Executed when Highlighting A Traffic Congestion Line 130

Figure 6:
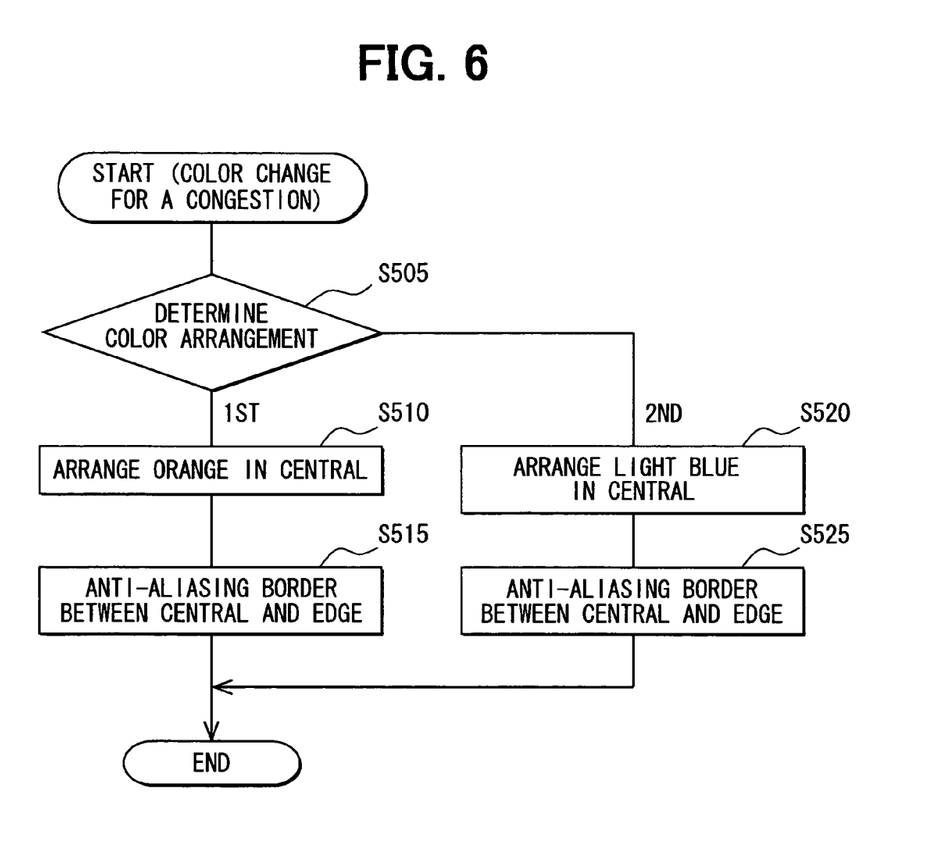
FIG. 6 is a flowchart for explaining a traffic congestion line color change operation.

The control section 17 constituting the navigation apparatus 10 highlights the A traffic congestion line 130 by alternately switching the first color arrangement and the second color arrangement in a period of one second while the A traffic congestion line 130 is displayed on the display 12. The control section 17 executes a traffic congestion line color change operation in which the color arrangement of the A traffic congestion line 130 is changed in a period of one second. The traffic congestion line color change operation is explained.

At S505, the control section 17 of the navigation apparatus 10 determines a next color arrangement of the A traffic congestion line 130 in accordance with a current color arrangement of the A traffic congestion line 130. When the next color arrangement is the first color arrangement, the control section 17 shifts the process to S510. When the next color arrangement is the second color arrangement, the control section 17 shifts the process to S520.

At S510, the control section 17 edits data of part corresponding to the A traffic congestion line 130 among the user's-vehicle periphery image data stored in the image data edit area of the RAM of the control section 17. Then, the control section 17 colors an area corresponding to the A traffic congestion line central area 210 of the A traffic congestion line enlarged image 200 with orange. The control section 17 shifts the process to S515.

At S515, the control section 17 edits data of part corresponding to the A traffic congestion line 130 among the user's-vehicle periphery image data stored in the image data edit area of the RAM of the control section 17, and applies anti-aliasing to pixels through which a boundary corresponding to the first A boundary 214 passes in the A traffic congestion line 130. Specifically, anti-aliasing is applied by setting, on pixels forming an area corresponding to the first anti-aliasing area 215, a combined color of orange of an area corresponding to the A traffic congestion line central area 210 and black of an area corresponding to the A congestion line edge area 220 in accordance with a ratio between the area corresponding to the A traffic congestion line central area 210 and the area corresponding to the A congestion line edge area 220. The control section 17 stores data showing positions of the pixels set in this process and colors set in the pixels into the RAM. The control section 17 may apply the above anti-aliasing by use of these data when the first color arrangement is executed to the A congestion line 130 in the future. Then, the control section 17 ends this process.

At S520 where the second color arrangement is executed to the A traffic congestion line 130, the control section 17 edits data of part corresponding to the A traffic congestion line 130 among the user's-vehicle periphery image data stored in the image data edit area of the RAM of the control section 17. The control section 17 colors the area corresponding to the A traffic congestion line central area 210 of the A traffic congestion line enlarged image 200 with light blue in the A traffic congestion line 130. The control section 17 shifts the process to S525.

At S525, the control section 17 edits data of part corresponding to the A traffic congestion line 130 among the user's-vehicle periphery image data stored in the image data edit area, and applies anti-aliasing to pixels through which a boundary corresponding to the first A boundary 214 passes in the A traffic congestion line 130. Specifically, anti-aliasing is applied by setting a combined color of light blue of the area corresponding to the A traffic congestion line central area 210 and black of the area corresponding to the A congestion line edge area 220 in each of the pixels forming the area corresponding to the first anti-aliasing area 215 in accordance with a ratio between the area corresponding to the A traffic congestion line central area 210 and the area corresponding to the A congestion line edge area 220 in each of the pixels. The control section 17 stores data showing positions of the pixels set in this process and colors set in the pixels into the RAM. The control section 17 may apply the above anti-aliasing by use of the data when the second color arrangement is executed to the A congestion line 130 in the future. Then, the control section 17 ends this process.

(2) Process Executed when C Traffic Congestion Line 150 is Highlighted

The control section 17 constituting the navigation apparatus 10 highlights the C traffic congestion line 150 by switching display states of the C traffic congestion line 150 in a period of one second while the C traffic congestion line 150 is displayed on the display 12. The C traffic congestion line 150 has an on state and an off state. The on state of the C traffic congestion line 150 is in a mode shown by the first C traffic congestion line enlarged image 300. The off state of the C traffic congestion line 150 is in a mode shown by the second C traffic congestion line enlarged image 400. The control section 17 executes a traffic congestion line blink operation of switching the display states of the C traffic congestion line 150 in a period of one second. The traffic congestion line blink operation is explained.

Figure 7:
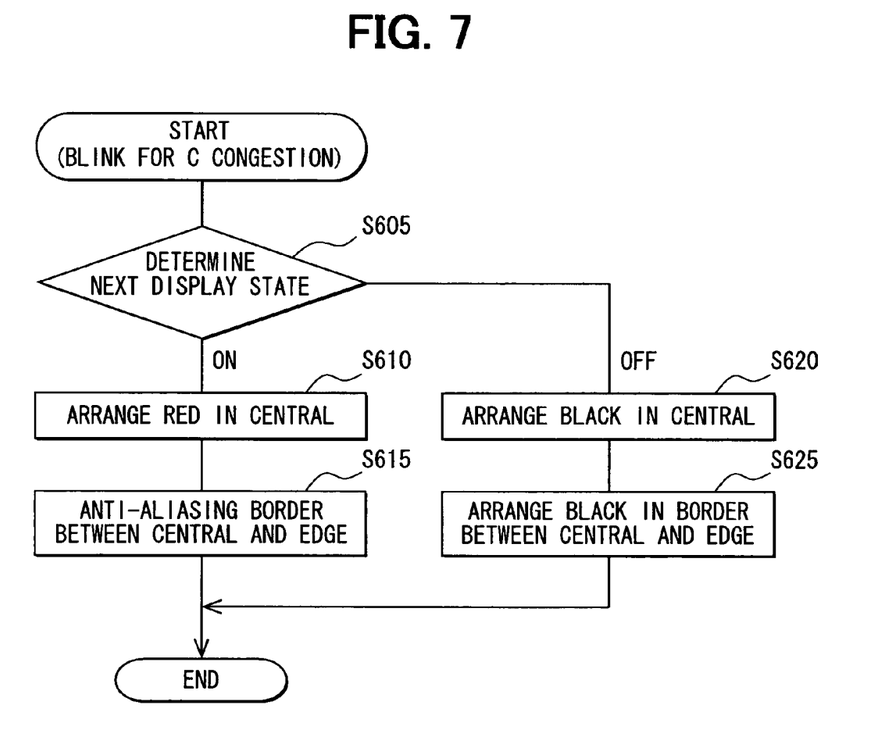
FIG. 7 is a flowchart for explaining a traffic congestion line blink operation.

At S605, the control section 17 of the navigation apparatus 10 determines the next display state of the C traffic congestion line 150 in accordance with the current display state of the C traffic congestion line 150. When the next display state is the on state, the control section 17 shifts the process to S610. When the next display state is the off state, the control section 17 shifts the process to S620.

At S610, the control section 17 edits data of part corresponding to the C traffic congestion line 150 among the user's-vehicle periphery image data stored in the image data edit area of the RAM of the control section 17, and colors the area corresponding to the first C traffic congestion line central area 310 of the first C traffic congestion line enlarged image 300 with red in the C traffic congestion line 150. Then, the control section 17 shifts the process to S615.

At S615, the control section 17 edits data of part corresponding to the C traffic congestion line 150 among the user's-vehicle periphery image data stored in the image data edit area, and applies anti-aliasing to pixels through which a boundary corresponding to the third C boundary 314 passes in the C traffic congestion line 150. Specifically, anti-aliasing is applied by setting a combined color of red of the area corresponding to the first C traffic congestion line central area 310 and black of the area corresponding to the C congestion line edge area 320 in each of the pixels forming the area corresponding to the third anti-aliasing area 315 in accordance with a ratio between the area corresponding to the first C traffic congestion line central area 310 and the area corresponding to the first C congestion line edge area 320. The control section 17 stores data showing the pixels set in this process and the colors set in the pixels into the RAM, and may apply the above anti-aliasing by use of these data when the C traffic congestion line 150 enters the on state in the future. Then, the control section 17 ends this process.

At S620 where the C traffic congestion line 150 enters the off state, the control section 17 edits data of part corresponding to the C traffic congestion line 150 among the user's-vehicle periphery image data stored in the image data edit area of the RAM of the control section 17, and colors, with black, the area corresponding to the first C traffic congestion line central area 310 of the first C traffic congestion line enlarged image 300 on the C traffic congestion line 150. Then, the control section 17 shifts the process to S625.

At S625, the control section 17 edits data of part corresponding to the C traffic congestion line 150 among the user's-vehicle periphery image data stored in the image data edit area, and colors, with black, pixels through which the boundary corresponding to the third C boundary 314 passes in the C traffic congestion line 150. That is, the area corresponding to the third anti-aliasing area 315 is colored with black in the C traffic congestion line 150. Accordingly, the C traffic congestion line 150 is in a mode shown by the second C traffic congestion line enlarged image 400. Then, the control section 17 ends this process.

<Advantage>

The navigation apparatus 10 of this embodiment changes a color of the area corresponding to the A traffic congestion line central area 210 of the A traffic congestion line enlarged image 200 in the A traffic congestion line 130 into orange and light-blue alternately by the traffic congestion line color change operation in a period of one second. When changing the color of this area, anti-aliasing is applied to the pixels through which the boundary corresponding to the first A boundary 214 passes in the A traffic congestion line 130. At this time, the anti-aliasing executed to the pixels through which the boundary corresponding to the second A boundary 224 passes is maintained. Therefore, with maintaining an appearance around the boundary between the A traffic congestion line 130 and its background, the color of the A traffic congestion line 130 can be changed and the A traffic congestion line 130 can be highlighted.

Anti-aliasing is not applied in this highlighting every time the colors of the pixels through which the boundary corresponding to the second A boundary 224 passes are changed. Since a map including complicated figures using many colors is drawn on the A traffic congestion line background area 230, it is thought that processing load on anti-aliasing to the boundary with the A traffic congestion line background area 230 is high. On the other hand, anti-aliasing is applied in the highlighting each time the colors of the pixels through which the boundary corresponding to the first A boundary 214 passes are changed in the A traffic congestion line 130. However, since the area corresponding to the A congestion line edge area 220 is constructed of a single color, it is thought that processing load of this anti-aliasing is low in comparison with a case where anti-aliasing is applied to the boundary with the A traffic congestion line background area 230. Therefore, the processing load can be reduced in comparison with a case where anti-aliasing is applied to the pixels through which the boundary corresponding to the second A boundary 224 in the A traffic congestion line 130 passes each time the color of the A traffic congestion line 130 is changed.

The navigation apparatus 10 of this embodiment changes, into red, black, and red alternately in a period of one second, the color of the area corresponding to the first C traffic congestion line central area 310 of the first C traffic congestion line enlarged image 300 by the traffic congestion line blink operation in the C traffic congestion line 150. When changing the color of this area from black into red, anti-aliasing is applied to the pixels through which the boundary corresponding to the third C boundary 314 passes in the C traffic congestion line 150. When changing the color of this area from red into black, the pixels through which the boundary corresponding to the third C boundary 314 passes is colored with black in the C traffic congestion line 150. When changing the color of this area, the anti-aliasing applied to the pixels through which the boundary corresponding to the fourth C boundary 324 passes is maintained in the C traffic congestion line 150. Therefore, highlighting such as blinking can be executed with maintaining an appearance around the boundary of the C traffic congestion line 150 and its background.

In this highlighting, anti-aliasing is not applied to the pixels through which the boundary corresponding to the fourth C boundary 324 in the C traffic congestion line 150 passes every time the color is changed. Since a map including complicated figures using many colors is drawn on the first C traffic congestion line background area 330, it is thought that anti-aliasing to the boundary of the first C traffic congestion line background area 330 has a high processing load. On the other hand, in this highlighting, anti-aliasing is applied to the pixels through which the boundary corresponding to the third C boundary 314 passes in the C traffic congestion line 150 only when changing the C traffic congestion line 150 from the off state to the on state. However, since the area corresponding to the first C traffic congestion line edge area 320 is comprised of a single color, it is thought that the processing load of this anti-aliasing is low in comparison with the case where anti-aliasing is applied to the boundary with the first C traffic congestion line background area 330. Therefore, the processing load can be reduced in comparison with the case where anti-aliasing is applied to the pixels through which the fourth C boundary 324 in the C traffic congestion line 150 passes each time the color of the C traffic congestion line 150 is changed, for example. The processing load can be reduced in comparison with the case where anti-aliasing is applied to the pixels around the boundary between the C traffic congestion line 150 and its background each time the C traffic congestion line 150 is highlighted by repeating disappearance and display of the C traffic congestion line 150 and displayed, for example.

The A traffic congestion line 130 and the C traffic congestion line 150 are bordered with strip-shaped areas having a width of over two dots. Therefore, appearances of these traffic congestion lines look attractive. When anti-aliasing is applied to the boundary of each area of the A traffic congestion line 130, the pixels of the area corresponding to the A traffic congestion line edge area 220 are not influenced by a color of the A traffic congestion line central area 210 and a color of the A traffic congestion line background area 230 at the same time, improving the appearance of the boundary between the A traffic congestion line 130 and its background. The pixels of the area corresponding to the first C traffic congestion line edge area 320 in the C traffic congestion line 150 are not influenced by a color of the C traffic congestion line central area 310 and a color of the C traffic congestion line background area 330 at the same time, improving the appearance of the border between the C traffic congestion line 150 and its background.

ALTERNATIVE EMBODIMENT (1) Only the color arrangement of the A traffic congestion line 130 is changed in the traffic congestion line color change operation. However, at the same time that the color arrangement is changed, a shape of the area corresponding to the A traffic congestion line central area 210 in the A traffic congestion line 130 may be changed. Depending on the color arrangement of the A traffic congestion line 130, the appearance of the A traffic congestion line 130 may be unattractive. In this case, the appearance of the A traffic congestion line 130 may be improved by changing a width of the area corresponding to the A traffic congestion line central area 210 in the A traffic congestion line 130.

(2) In the traffic congestion line blink operation, the color of the center portion of the C traffic congestion line 150 is only red in the on state. However, each time the C traffic congestion line 150 enters the on state, the color of the center portion of the C traffic congestion line 150 may be changed. That is, each time the C traffic congestion line 150 enters the on state, the color of the central portion of the C traffic congestion line 150 may be changed from red to yellow or from yellow to red. Even in such a mode, highlighting of, for example, the C traffic congestion line 150 can be executed.

<Functions>

The navigation apparatus 10 functions as an example of an image data update apparatus. The control section 17 functions as an example of an image data update means or unit. The image data edit area of the RAM of the control section 17 functions as an example of an image data storage means or unit.

The traffic congestion line color change operation and traffic congestion line blink operation function as an example of an image data update operation.

S510, S515, S520, and S525 of the traffic congestion line color change operation and S610 and S615 of the traffic congestion line blink operation may be referred to as a first step.

S620 and S625 of the traffic congestion line blink operation may be referred to as a second step.

The user's-vehicle periphery image data and the user's-vehicle periphery image 100 before executing the traffic congestion line color change operation may be first image data and a first image, respectively. The user's-vehicle periphery image data and the user's-vehicle periphery image 100 after executing the traffic congestion line color change operation may be second image data and a second image, respectively.

The user's-vehicle periphery image data and the user's-vehicle periphery image 100 before executing the traffic congestion line blink operation may be the first image data and the first image, respectively. The user's-vehicle periphery image data and the user's-vehicle periphery image 100 after executing S610 and S615 of the traffic congestion line blink operation may be the second image data and the second image, respectively. The user's-vehicle periphery image data and the user's-vehicle periphery image 100 after executing S620 and S625 of the traffic congestion line blink operation may be third image data and a third image, respectively.

The area corresponding to the A traffic congestion line central area 210 in the A traffic congestion line 130 before executing the traffic congestion line color change operation may be a first component.

The area corresponding to the first C traffic congestion line central area 310 in the C traffic congestion line 150 before executing the traffic congestion line blink operation may be the first component.

The area corresponding to the A congestion line edge area 220 in the A traffic congestion line 130 and the area corresponding to the first C traffic congestion line edge area 320 in the C traffic congestion line 150 correspond to a first area.

The area corresponding to the A traffic congestion line central area 210 in the A traffic congestion line 130 after executing the traffic congestion line color change operation may be a second component.

The area corresponding to the first C traffic congestion line central area 310 in the C traffic congestion line 150 after executing S610 and S615 of the traffic congestion line blink operation may be the second component.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

Aspects of the disclosure described herein are set out in the following clauses.

As an aspect of the disclosure, an image data update apparatus is provided as follows. The apparatus updates image data showing an image including two areas. The anti-aliasing is applied to pixels around a boundary between the two areas to smooth change of color on the boundary. The image data update apparatus includes an image data storage means for storing first image data showing a first image, part of which includes a first component, which has a first area including a predetermined color and separating the first component and a background area of the first component, and in which the anti-aliasing is applied to pixels around a boundary between the first component and the first area and to pixels around a boundary between the first area and the background area. The image data update apparatus includes an image data update means for executing an image data update operation having a first step of generating second image data by changing a portion corresponding to an area including the first component and the first area in the first image among the first image data stored in the image data storage means while maintaining the anti-aliasing applied to the pixels around the boundary between the first area and the background area.

Accordingly, the first component can be changed with maintaining attractiveness of appearance around the boundary between the first area and the background area. Therefore, the first component can be highlighted with maintaining attractiveness of appearance of the first component to some degree.

For example, when a complicated image using many colors, such as a map of an urban area, is drawn on the background area, processing load of the anti-aliasing applied to the pixels around the boundary between the first component and the background area becomes high. It is not necessary to apply the anti-aliasing to the pixels around the boundary between the first component and the background area in the image data update apparatus. Accordingly, the processing load can be reduced in comparison with a case where the first component adjoins the background area and the anti-aliasing is applied to the pixels around the boundary between the first component and the background area each time the first component is changed.

Therefore, with suppressing the increase in the processing load, the component can be updated and highlighted.

Additionally, when changing the first component, it becomes possible to generate image data showing an attractive image by applying the anti-aliasing to the pixels around the boundary between the first component and the background area.

As an optional aspect of the image data update apparatus, a second image shown by the second image data generated at the first step of the image data update operation by the image data update means is an image, which is generated by changing the first component in the first image into a second component, and in which the anti-aliasing is applied to pixels around a boundary between the second component and the first area.

Accordingly, the image data showing a more attractive image can be generated.

It is necessary to apply the anti-aliasing to the pixels around the boundary between the newly drawn second component and the first area, but the first area is composed of a predetermined color. Therefore, it is also possible to prepare data showing positions and colors of pixels to which the anti-aliasing is applied together with the image data of the second component. That is, for example, in comparison with a case where the anti-aliasing is applied to the pixels around the boundary between the second component and the background area, the processing load of the anti-aliasing applied to the pixels around the boundary between the second component and the first area is low.

Therefore, the component can be updated and highlighted with maintaining attractiveness of the appearance of the component to which the anti-aliasing is applied and with suppressing increase in the processing load.

A new component overwritten on the image shown by the first image data may be as follows.

As an optional aspect of the image data update apparatus, the second component in the second image shown by the second image data generated in the data update operation by the image data update means is a component different only in color from the first component.

Accordingly, highlighting becomes possible by changing a color of the component.

The image data update apparatus may highlight the component as follows.

As an optional aspect of the image data update apparatus, the image data update means stores the generated second image data in the image data storage means as the first image data in the image data update operation, and repeats the image data update operation.

The image data update means may repeat the image data update operation sequentially or at time intervals.

Accordingly, with suppressing the processing load, the component can be highlighted, for example, using a method of changing a color of the component periodically.

Before the image data update means executes the next image data update operation, data corresponding to the background area in the first image data stored in the image data storage means may be edited. Even when the data corresponding to the background area is edited, the advantage of this invention is not prevented as long as the anti-aliasing applied to the pixels around the boundary between the first area and the background area is maintained.

The image data update apparatus may highlight the component as follows.

As an optional aspect of the image data update apparatus, the image data update means, before the first step, generates a third image data showing a third image generated by coloring, with a predetermined color of the first area, the first component and the first area while maintaining the anti-aliasing applied to the pixels around the boundary between the first area and the background area in the first image shown by the first image data stored in the image data storage means, executes a second step of storing the generated third image data in the image data storage means as the first image data, and after the first step, the image data update means stores the second image data into the image data storage means as the first image data and repeats the image data update operation.

The area composed of the first component and the first area is repeatedly changed between a state where the component is drawn and a state where the component is colored with a single color. Accordingly, the component drawn on this area can be highlighted. When coloring this area with a single color, it is not necessary to apply the anti-aliasing to the pixels around the boundary with the background area. Therefore, it becomes possible to highlight this component with suppressing the increase in the processing load.

As an optional aspect of the image data update apparatus, the second component may be as follows. In the image data update apparatus, the second component in the second image shown by the second image data generated in the image data update operation by the image data update means is identical with the first component.

Accordingly, by blinking the first component, effectiveness similar to the highlighting can be acquired.

As an optional aspect of the image data update apparatus, the second component may be as follows.

As an optional aspect of the image data update apparatus, the second component in the second image shown by the second image data generated in the image data update operation by the image data update means is different only in color from the first component.

Accordingly, effectiveness similar to change of color of the first component at the same time of blinking the first component can be acquired.

The first area separating the first component and its background may be as follows.

As an optional aspect of the image data update apparatus, the first area separating the first component and the background area has a strip-shaped area.

Accordingly, appearance of the first component and the second component can be improved.

In order to improve appearance of the boundary between the first component and the first area and the boundary between the first area and its background area, the following structure may be used.

As an optional aspect of the image data update apparatus, the first area having a strip shape has a width of at least two pixels or over.

As one method of the anti-aliasing, a combined color of colors of two areas to which the anti-aliasing is to be applied may be set in pixels through which a boundary between the two areas passes in accordance with a ratio between the areas in each of the pixels. In such a method, when a width of the first area is less than two pixels, the pixels of the first area may be influenced by a color of the first component and a color of the background area at the same time. Therefore, the first area always has a width of over two pixels, so that the pixels of the first area may not be influenced by a color of the first component and a color of the background area at the same time. The appearance of the boundary between the first component and the first area and the appearance of the boundary between the first area and the background area can be improved.

It will be obvious to those skilled in the art that various changes may be made in the above-described embodiments of the present invention. However, the scope of the present invention should be determined by the following claims.

What is claimed is:

1. An image data update apparatus, the apparatus updating image data showing an image including two areas, anti-aliasing being applied to pixels around a boundary between the two areas, the anti-aliasing smoothing change of color on the boundary, the apparatus comprising:
   an image data storage means for storing first image data showing a first image, part of which includes a first component and a first area with a predetermined color, the first area separating from each other the first component and a background area of the first component, wherein the anti-aliasing is applied to a pixel around a boundary between the first component and the first area and to a pixel around a boundary between the first area and the background area; and
   an image data update means for executing an image data update operation having a first step of generating second image data wherein:
   (i) a second image shown by the second image data generated at the first step of the image data update operation by the image data update means is an image which is generated by changing the first component in the first image into a second component with respect to color,
   (ii) the first area separating the first component and the background area is a strip-shaped area having a width of at least two pixels or over; and
   (iii) when the image data update means changes the first component in the first image with respect to the color among the first image data stored in the image data storage means, the anti-aliasing applied to the pixel around the boundary between the first area and the background area is maintained, while anti-aliasing is applied to the pixel around a boundary between the second component and the first area.

2. The image data update apparatus of claim 1, wherein the image data update means stores the generated second image data in the image data storage means as the first image data in the image data update operation, and repeats the image data update operation.

3. The image data update apparatus of claim 1, wherein the image data update means, before the first step, generates third image data showing a third image generated by coloring, with the predetermined color of the first area, the first component and the first area while maintaining the anti-aliasing applied to the pixels around the boundary between the first area and the background area in the first image shown by the first image data stored in the image data storage means, executes a second step of storing the generated third image data in the image data storage means as the first image data, and after the first step, stores the second image data as the first image data into the image data storage means and repeats the image data update operation.

4. The image data update apparatus of claim 3, wherein the second component in the second image shown by the second image data generated in the image data update operation by the image data update means is identical with respect to a shape with the first component.

5. A non-transitory computer readable storage medium containing instructions readable and executable by a computer, the instructions for causing the computer to function as the means included in the image data update apparatus according to claim 1.

6. A method for generating a road map image using anti-aliasing to a pixel around a boundary between two areas in a road map for smoothing change of color on the boundary, the method comprising:
   arranging, in an image, (i) a background area, (ii) an indication area, and (iii) an edge area having a predetermined color, the edge area intervening between the background area and the indication area;
   applying anti-aliasing to pixels around, of the edge area, an outer boundary and an inner boundary to thereby complete generation of a first image, the outer boundary intervening between the background area and the edge area, the inner boundary intervening between the indication area and the edge area; and
   updating the first image by changing the indication area in a color to thereby complete generation of a second image, wherein:
   (i) the edge area intervening between the indication area and the background area is a strip-shaped area having a width of at least two pixels; and
   (ii) in the changing of the indication area in the color, the anti-aliasing, having been applied to the pixels around the outer boundary intervening between the background area and the edge area, is unchanged while anti-aliasing is newly applied to the pixels around the inner boundary intervening between the edge area and the indication area, which is changed in the color.

7. The method according to claim 6, wherein
in the updating the first image, the indication area is changed in the color corresponding to the predetermined color of the edge area while the anti-aliasing, having been applied to the outer boundary, is unchanged while the predetermined color is arranged to the pixels around the inner boundary intervening the indication area and the edge area.

8. The method according to claim 6, wherein
a combination of the indication area and the edge area illustrates a traffic congestion line indicating a degree of traffic congestion of a road on the road map image.

9. The image data update apparatus of claim 1, wherein the second component in the second image shown by the second image data generated in the image data update operation by the image data update means is different from the first component in respect of a shape of the first component as well as the color.

10. A non-transitory computer-readable medium comprising instructions for execution by a computer, the instructions implementing the method according to claim 6.

11. An image data update apparatus, comprising:
a storage unit that stores first image data that visualizes a first image, the first image including a first main part, a background part, and a separation part of a predetermined color, the separation part being strip-shaped and of a width of at least two pixels, and separating the first main part and the background part; and
a control unit that performs anti-aliasing on a pixel around a first main part boundary that is visualized between the first main part and the separation part, as well as on a pixel around a second main part boundary that is visualized between the separation part and the background part, the control unit further generating second image data that visualizes a second image that includes the first background part, the first separation part, and a second main part that is a different in color than the first main part, wherein
in generating the second image data, the control unit performs no further anti-aliasing as to the pixel around the second boundary, but performs additional anti-aliasing on the pixel around the first boundary that is visualized between the second main part and the separation part.

* * * * *